United States Patent [19]

Ida et al.

[11] Patent Number: 4,998,137

[45] Date of Patent: Mar. 5, 1991

[54] SHEET STORING DEVICE

[75] Inventors: Masayuki Ida, Yamato-Koriyama; Yuuji Sugimoto, Nara; Yoshihumi Shibano, Yamato-Koriyama, all of Japan

[73] Assignee: Sharp Kabushiki Kaisha, Osaka, Japan

[21] Appl. No.: 521,692

[22] Filed: May 10, 1990

[30] Foreign Application Priority Data

May 15, 1989 [JP] Japan .............................. 1-55895[U]

[51] Int. Cl.[5] ............................................ G03B 27/58

[52] U.S. Cl. ....................................... 355/72; 271/145

[58] Field of Search .......................... 355/72; 272/145

[56] References Cited

U.S. PATENT DOCUMENTS 1,113,549 10/1914 Franke .................................. 355/72

4,569,587 2/1986 Miyoshi et al. ........................ 355/72

4,621,272 11/1986 Toriumi et al. ........................ 355/72

FOREIGN PATENT DOCUMENTS 56-59245 5/1981 Japan .

59-123859 7/1984 Japan .

*Primary Examiner*—Monroe H. Hayes

*Attorney, Agent, or Firm*—David G. Conlin; Robert M. Asher

[57] ABSTRACT

A device for storing rectangular sheets to be fed into a sheet conveying path in an image forming apparatus comprises a sheet tray for stacking thereon the rectangular sheets. The movable tray having a first and second sides used for longitudinal and lateral feeds of a sheet with respect to the sheet conveying path, respectively, is movably supported on a base member for the movement between a first and second positions at which the first and second sides of the sheet tray are located at a constant position for the longitudinal and lateral feeds of the sheet, respectively. A connecting member is joined to the sheet tray at a position near the intersection of the first and second sides thereof. A reciprocating device is provided for causing the sheet tray to be moved between the first and second positions by reciprocating the connecting member in a direction transverse to the feeding direction of the sheet with respect to the sheet conveying path. A locking device is provided for locking the sheet tray to the base plate at diagonal positions to the connecting member with respect to the first and second positions of the sheet tray.

7 Claims, 6 Drawing Sheets

SHEET STORING DEVICE

BACKGROUND OF THE INVENTION

1. Field of the Invention

The present invention relates to a device for storing rectangular sheets to be fed into a sheet conveying path in an image forming apparatus such as copying apparatus or the like, which can change the orientation of the sheets in accordance with longitudinal and lateral feeds of the sheets.

2. Description of the Related Art

Generally, copying apparatuses are provided with a device for storing rectangular sheets such as papers or transparent films which are to be fed into a sheet conveying path in a main body of the copying apparatus. An exemplary sheet storing device is equipped with a plurality of sheet cassettes for different sized of sheets, such as sheets of A3, B4, A4, and B5 sized etc. In order to shorten a time necessary for conveying the rectangular sheet through the conveying path of the copying apparatus, it is desirable to perform lateral feed of the sheet in that the short sides of the rectangular sheet are parallel to the feeding direction of the sheet rather than longitudinal feed of the sheet in that the long sides of the rectangular sheet are parallel to the feeding direction. For this purpose, several types of copying apparatus have been constructed to perform lateral feed of sheets even when the sheets are of relatively large size such as B4 or A3 size.

However, such a construction for performing lateral feed of relatively large sheets causes other functional units, such as a photo sensitive drum, conveying rollers, a developing unit, a fixing unit etc., of the copying apparatus to be made in large size correspondingly, resulting in an increase of the copying apparatus in size as well as an increase of manufacturing cost thereof. Accordingly, in general, copying apparatuses in which relatively large sheets, e.g., sheets of B4 or A3 size can only be fed longitudinally have been widely used.

In this case, however, particularly in copying apparatuses having functions of reduction and enlargement of size such as zooming up/down function etc., it is necessary for size-reduction copying to use cassettes of B5R-, and A4R-size types for the longitudinal feed of sheets of B5 and A4 sizes, while it is also necessary, when feeding speed is taken into consideration, to use cassettes of B5-, and A4-size types for the lateral feed of sheets of B5 and A4 sizes.

In order to satisfy the above-mentioned requirements, a sheet feeder must be constructed to receive all of the above-mentioned various cassettes, or replacement of cassettes for each purpose will be required. This means that the sheet feeder must be fabricated in much larger size at high cost or troublesome operations for replacing the cassettes are required.

As disclosed for example in Japanese Unexamined Patent Publications (KOKAI) No. 56-59245, laid open in 1981 and No. 56-59251, laid open in 1981, there has been proposed a sheet feeder for eliminating the above-mentioned problems, in which a rotatable tray or cassette for stacking or storing thereon sheets of B5-, or A4-size is used for both longitudinal and lateral feeds of the sheets. The common cassette disclosed is supported by a support member for rotation about an axis which is located at a fixed position with respect to the support member.

In this case, however, when the rotatable cassette is rotated between a first or longitudinal feed-out position and a second or lateral feed-out position with respect to the conveying path of the sheet in the copying apparatus, the distance between a pickup roller and the cassette varies with the positions of the cassette. Accordingly, after arriving of the rotatable cassette at its lateral feed-out position, the rotatable cassette as well as the support member must be moved toward the pickup roller, or the pickup roller must be moved toward the cassette to reduce the distance therebetween. In this case, however, it is necessary to provide drive means for moving the rotatable cassette or the pickup roller in addition to drive means for rotating the cassette, so that the construction of the sheet feeder becomes complicated and, thus, the manufacturing cost thereof is increased. Moreover, since a certain time for the additional movement of the cassette or the pickup roller for decreasing the distance therebetween is required, it becomes difficult to start promptly the feeding of sheet after rotational displacement of the cassette. Especially, in the case that the pickup roller is moved toward the cassettes which is located at its lateral feed position, the conveying path of the sheet in the copying apparatus becomes longer due to the retraction of the leading edge of the sheet in the cassette from the position thereof when the cassette is located at its longitudinal feed position, resulting in an increase of time for conveying the sheet.

As an example of construction for solving the above-mentioned defects, it may be considered to provide a tray drive unit in which a movable tray or cassette for stacking or storing thereon sheets is rotatably supported on the movable support member which, in turn, is movably supported on a base member in a direction generally parallel to the feeding direction of the sheet, and in which a reciprocating member is reciprocatingly driven by a drive unit along a guide shaft in a direction generally perpendicular to the feeding direction of the sheet while being in engagement with the movable tray or cassette at a position near the intersection of a longitudinal feedout side and a lateral feed-out side of the movable tray or cassette. In this construction, the reciprocating motion of the reciprocating member causes the movable tray or cassette to be rotated while being moved in a direction generally parallel to the feeding direction of the sheet. Accordingly, the longitudinal and lateral feed-out sides of the movable tray or cassette will be directly moved to a constant position with respect to the pickup roller.

In this case, however, it is considered that further problems will occur. Namely, in a case that a large number of sheets are loaded on the movable tray or cassette, an increased inertia force of rotation of the movable tray will be generated due to their weight. Thus, the reciprocating member may run over the predetermined position due to slippage of the reciprocating member against the shaft, causing the movable tray or cassette to be postured in inclination with the direction of the feeding direction of the sheets.

SUMMARY OF THE INVENTION

It is therefore an object of the present invention to provide a device for storing rectangular sheets to be fed into a sheet conveying path in an image forming apparatus, which can move the sheets between two positions at which longitudinal and lateral feeds of the sheets can be started at a constant position with respect to the sheet conveying path without changing the length of the sheet conveying path in the image forming apparatus, and which can prevent deviations of angular position of the sheets when feeding of the transfer sheet is performed.

According to the present invention, the abovementioned object can be achieved by a device for storing rectangular sheets to be fed into a sheet conveying path in an image forming apparatus, comprising: a sheet tray for stacking thereon the rectangular sheets, the movable tray having a first and second sides used for longitudinal and lateral feeds of a sheet with respect to the sheet conveying path, respectively, the sheet tray being movably supported on the base member for the movement between a first and second positions at which the first and second sides of the sheet tray are located at a constant position for the longitudinal and lateral feeds of the sheet, respectively; a connecting member joined to the sheet tray at a position near the intersection of the first and second sides thereof; reciprocating means for causing the sheet tray to be moved between the first and second positions by reciprocating the connecting member in a direction transverse to the feeding direction of the sheet with respect to the sheet conveying path; and locking means for locking the sheet tray to the base member at diagonal positions to said connecting member with respect to the first and second positions of the sheet tray.

In the above-mentioned construction of the present invention, reciprocating motion of the connecting member causes the sheet tray to be moved between the first and second positions at which the first and second sides of the sheet tray for longitudinal and lateral feeds of a sheet are located at the constant position, respectively. Accordingly, immediately after arriving at the first and second positions, longitudinal and lateral feeds of the sheets can be started at the constant position with respect to the sheet conveying path, without changing the length of the sheet conveying path in the image forming apparatus.

When the sheet tray arrives at the first and second positions, the locking means can lock the same to the base member at diagonal positions to said connecting member with respect to the first and second positions of the sheet tray. Therefore, the sheet tray can be accurately stopped at the first and second positions without generating deviations of angular positions of the sheet tray even when a large number of sheets are stacked on the sheet tray, thereby preventing the deviations of angular position of the sheets when feeding of the sheet is preformed. Particularly, in the above-mentioned construction of the locking means, when the sheet tray arrives at the first and second positions, it can be stopped by the connecting member and the locking means at two positions which are diagonal to each other with respect to the sheet tray. This means that the sheet tray can be effectively locked at positions at which greatest angular deviation of the sheet tray may occur.

Preferably, the base member is provided with an arm which is pivotally mounted at one end thereof on the base member, and the sheet tray is rotatably supported on the other end of the arm so as to move between the first and second positions, when the connecting member is reciprocatingly moved, in such a manner that the sheet tray is rotated while being moved in a direction generally parallel to the feeding direction of the sheet. This construction makes it possible to change the position of the sheet tray between the first and second positions for longitudinal and lateral feeds of a sheet without using individual drive means for the rotational and linear movements of the sheet tray.

Preferably, the base plate is detachably inserted into the image forming apparatus, so that sheets can be easily loaded on the sheet tray outside the image forming apparatus.

Further objects, features and advantages of the present invention will become apparent from the following description of the preferred embodiments of the present invention as illustrated in the accompanying drawings.

DESCRIPTION OF THE PREFERRED EMBODIMENT

FIGS. 1 to 5 illustrate an embodiment of the present invention.

Figure 2:
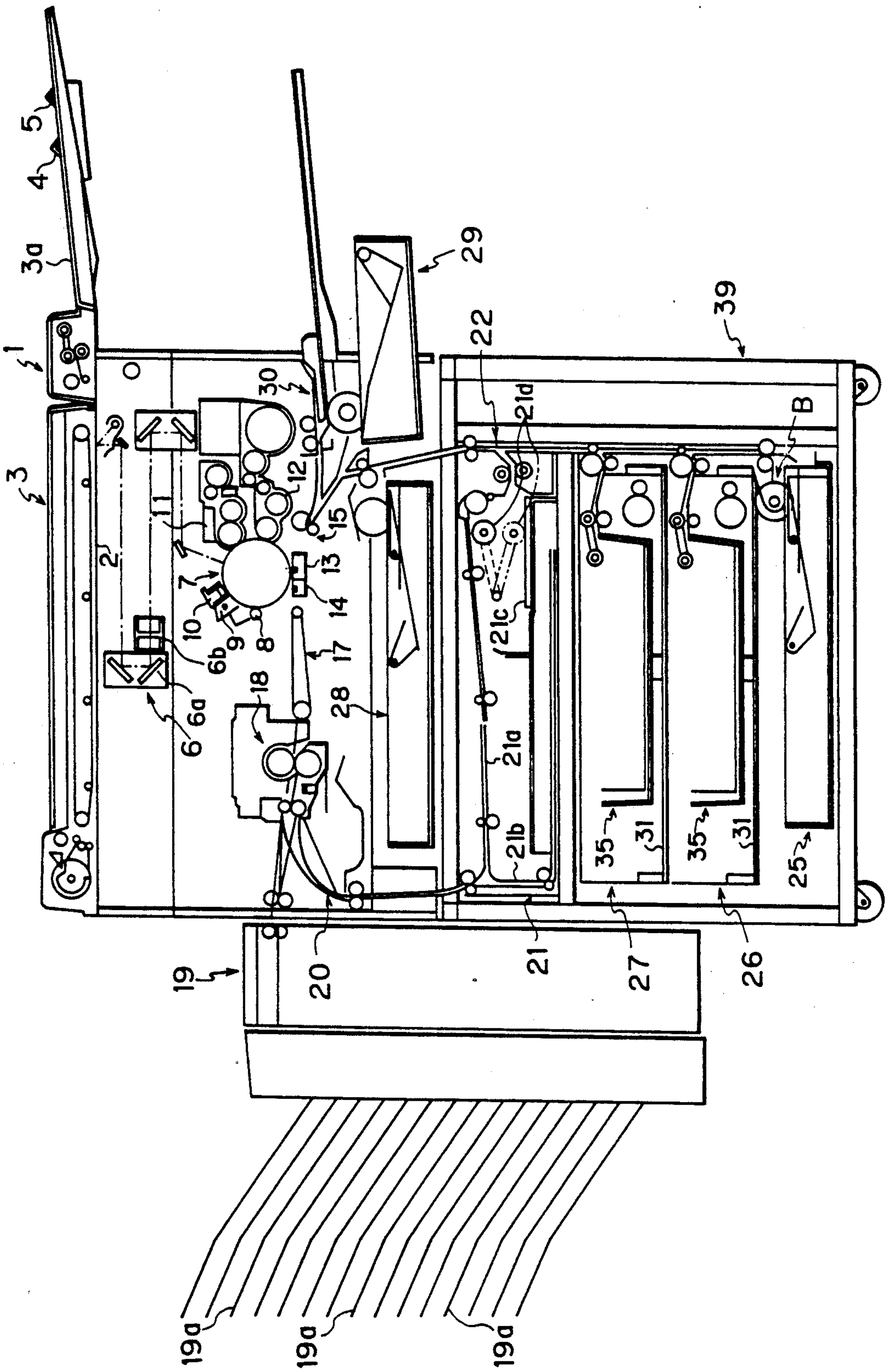
FIG. 2 is a front view schematically showing an internal structure a copying apparatus.

Referring first to FIG. 2, there is shown a copying apparatus as an image forming apparatus, generally designated by reference numeral 1, in which an automatic document feeder (hereinafter referred to as ADF) 3 is provided on an original plate glass 2. The ADF 3 has functions to convey an original (not shown) from an original carrying tray **3*a* to a predetermined position on the original plate glass 2 in accordance with the size of the original or the feeding direction of the original, as well as to deliver the original out of the ADF 3 after the completion of copying. Further, for enabling two-sided copying, the illustrated ADF 3 has an additional function to reverse the original up side down, to convey again the same to the predetermined position on the original plate glass 2, and to deliver the original out of the ADF 3 after the completion of two-side copying. On the carrying tray 3*a* are provided switches 4, 5** to distinguish the size of the original placed thereon.

An optical system 6 comprising a reflex mirrors **6*a* and lenses 6*b* are disposed below the original plate glass 2. The optical system 6 has a basic function to guide a reflected light from the original to a photo sensitive drum 7** and an additional function to vary magnification. Therefore, it is constructed to make possible an enlarging copying or a reducing copying without saying that copying of equal magnification.

Disposed around the photo sensitive drum 7 are a developing device having a cleaner 8, a charge elimination element 9, an electric charger 10, a developing unit 11 having toner for color copying, and a developing means 12 having a black toner. By these components, removal of remaining toner, charge elimination, electric charge, exposure (by the optical system 6) and development are sequentially performed with respect to the photo sensitive drum 7.

A transfer charger 13 and a separation charger 14 are disposed under the photo sensitive drum 7. When a sheet or paper (not shown), passes through the space between the transfer charger 13 and the photo sensitive drum 7, a toner image formed on the photo sensitive drum 7 is transferred to the transfer paper. By the separation charger 14, the transfer paper is separated from the photo sensitive drum 7. The separated transfer paper is then conveyed to a fixing device 18 by a conveying belt 17. The fixing device 18 fixes the toner on the transfer paper by heating or applying pressure.

The transfer paper which has passed through the fixing device 18 is fundamentally delivered out of the copying apparatus, i.e., to a receptor bins 19*a* through sorter 19. On the other hand, for example, when two-sided copying or synthesizing copying is to be performed, the transfer paper is guided to a two-side and synthesis unit 21 through a paper-returning path 20. In the case that the two-sided copying is to be performed, the sheet is reversed and then placed on an intermediate tray 21*c* through a first conveying path 21*a* within a two-side and synthesis unit 21. Thereafter, the transfer paper is fed out to a paper-feeding path 22 by a feed-out roller 21*d*. On the other hand, in the case of the synthesis copying, the transfer paper is fed to a second conveying path 21*b* within the two-side and synthesis unit 21. After the trailing edge of the transfer paper is detected at the second conveying path 21*b*, the trailing edge of the transfer paper is fed back in such a manner that the trailing edge becomes a leading edge in the advancing direction. The transfer paper is reversed and then placed on the intermediate tray 21*c* through the first conveying path 21*a*. Thereafter, the transfer paper is fed out to a paper-feeding path 22 by the feed-out roller 21*d*.

The paper-feeding path 22 serves to guide the transfer paper toward the photo sensitive drum 7 and is provided at its terminal end with a paper-stopping roller 15 so as to adjust the rotation timing of the photo sensitive drum 7 with the feed-out timing of the transfer paper. Moreover, the paper-feeding path 22 is connected with a plurality of paper-feeding means from which a transfer paper is appropriately supplied. Concretely, the following components are provided in the copying apparatus 1 in order from the lowest position; i.e., a first fixed cassette 25, a first movable cassette unit 26, a second movable cassette unit 27, the two-side and synthesis unit 21, a second fixed cassette 28, a third fixed cassette 29 and a manual sheet feeder 30. The first fixed cassette 25, the second fixed cassette 28 and the third fixed cassette 29 are detachably inserted into the copying apparatus 1. The first movable cassette unit 26 and the second movable cassette unit 27 are arranged to be pulled out of the copying apparatus 1, together with their base plate 31.

The first and second movable cassettes 26 and 27 are constructed in accordance with the present invention, as described bellow.

Figure 3:
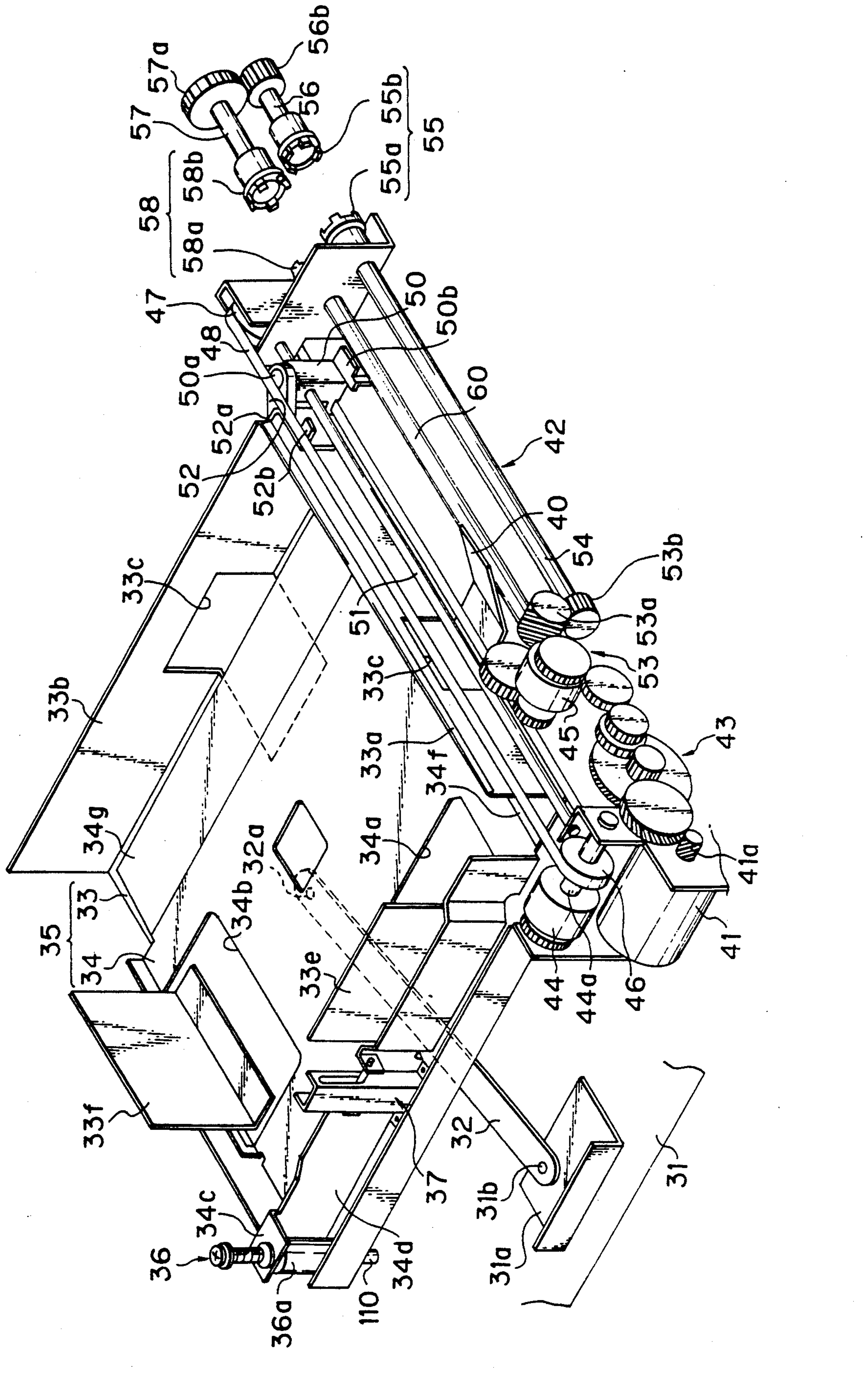
FIG. 3 is a perspective view of the sheet storing device shown in FIG. 1A.

In the first and second movable cassette units 26 and 27, as also illustrated in FIG. 3, a pedestal 31*a* is secured to the base member or plate 31 which constitutes a part of a casing of the corresponding movable cassette unit. An arm 32 is pivoted at one end thereof to the pedestal 31*a* through a support shaft shaft 31*b* for horizontal rotation about the support shaft 31*b*. Another support shaft 32*a* is provided on the other end of the arm 32, and a sheet tray or movable cassette 35 is rotatably supported to the arm 32 through the support shaft 32*a*. The movable cassette 35 is in a two-plate construction comprising a base plate or paper feeding base 33 and a upper plate or movable plate 34 disposed on the paper feeding base 33. The movable cassette 35 is capable of being moved between first and second positions for the longitudinal and lateral transference of transfer papers placed on the movable plate 34 by being rotated at 90° together with the movable plate 34. The journalled position of the movable cassette 35 on the support shaft 32*a* is so settled that the center of the transfer paper runs on the above-mentioned support shaft 32*a* in each position of the above-mentioned longitudinal position and the lateral position.

A first or longitudinal feed-out side and a second or laterally feed-out side of the paper-feeding base 33 are formed with wall portions 33*a* and 33*b*, respectively, for preventing the loaded transfer papers from being gotten out of the place. The wall portions 33*a* and 33*b* are in a folded state. At almost centers of the wall portions 33*a* and 33*b* are respectively formed notches 33*c*. Each notch 33*c* is so formed that it reaches a bottom plate of the paper-feeding base 33 and enter therein to the extent of a predetermined length toward the center direction of the bottom plate. A lift plate 40 is disposed below the paper-feeding base 33 an encounters the rear face of the bottom plate of the movable plate 34. The lift plate 40 will be described later.

Wall portions 33*e* and 33*f* are disposed on the paper-feeding base 33 so as to respectively face to the wall portions 33*a* and 33*b*. These wall portions 33*e* and 33*f* are provided crossing the notches 34*a* and 34*b* formed on the movable plate 34 and are constructed not to interfere the movement of the movable plate 34 to lift up one side of the copy copy.

The longitudinal feed-out side and the laterally feed-out side in the movable plate 34 are respectively formed with inclining portions 34*f* and 34*g* which incline with respect to the main body portion of the movable plate 34. At the corner portion at the space between a non feed-out side to the longitudinal feed-out side and a non feed-out side of the lateral feed-out side in the movable plate 34, a supporting piece portion 34*c* is formed in a bent state in such a manner that the support piece portion 34*c* extends outwardly from the top end of the wall portion 34*d* of the movable plate 34. Thus, a support structure 36 is constructed where the movable plate 34 is supported at one point, i.e., at the support piece portion 34*c*. A stop portion 110 is hung down from the paper-feeding base 33 at a lower-face position of the paper-feeding base 33 on which the support portion 36*a* of the support structure is installed.

A guide member 37 is provided at the side of the non feed-out side of the movable cassette 35 which is a position slightly apart from the support structure 36 to the longitudinal feed-out side. The guide member 37 conducts to guide the movable plate 34 in the vertical direction at the time when the longitudinal feed-out side of the movable 34 is lifted up. On the other hand, when the transverse feed-out side of the movable plate 34 is lifted up, the guide member 37 acts as a rotationally movable fulcrum portion.

Figure 1A:
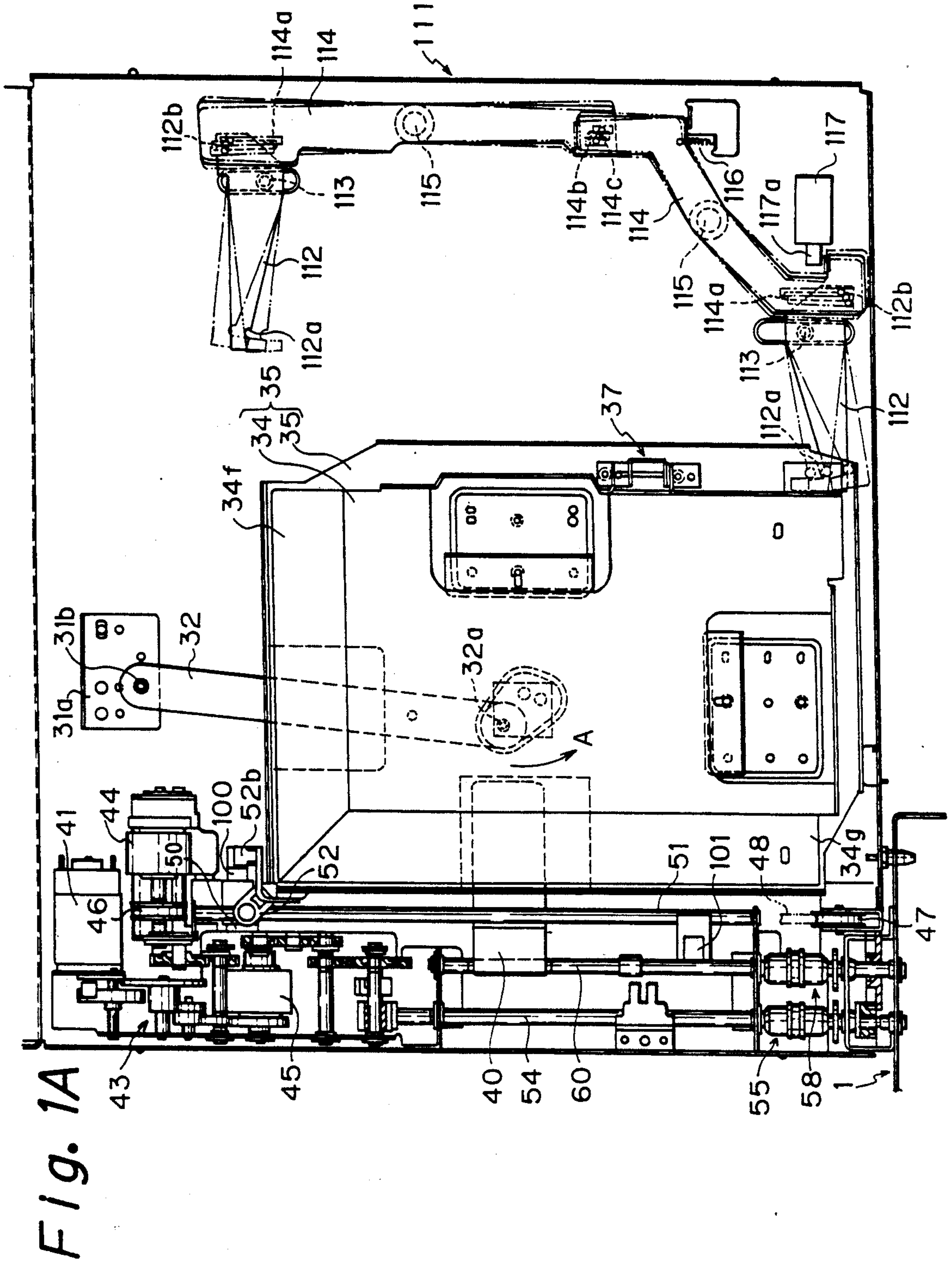
FIG. 1A is a plan view illustrating one embodiment of a sheet storing device according to the present invention, in which a sheet tray is located at a first position for longitudinal feed of the sheet.
Figure 1B:
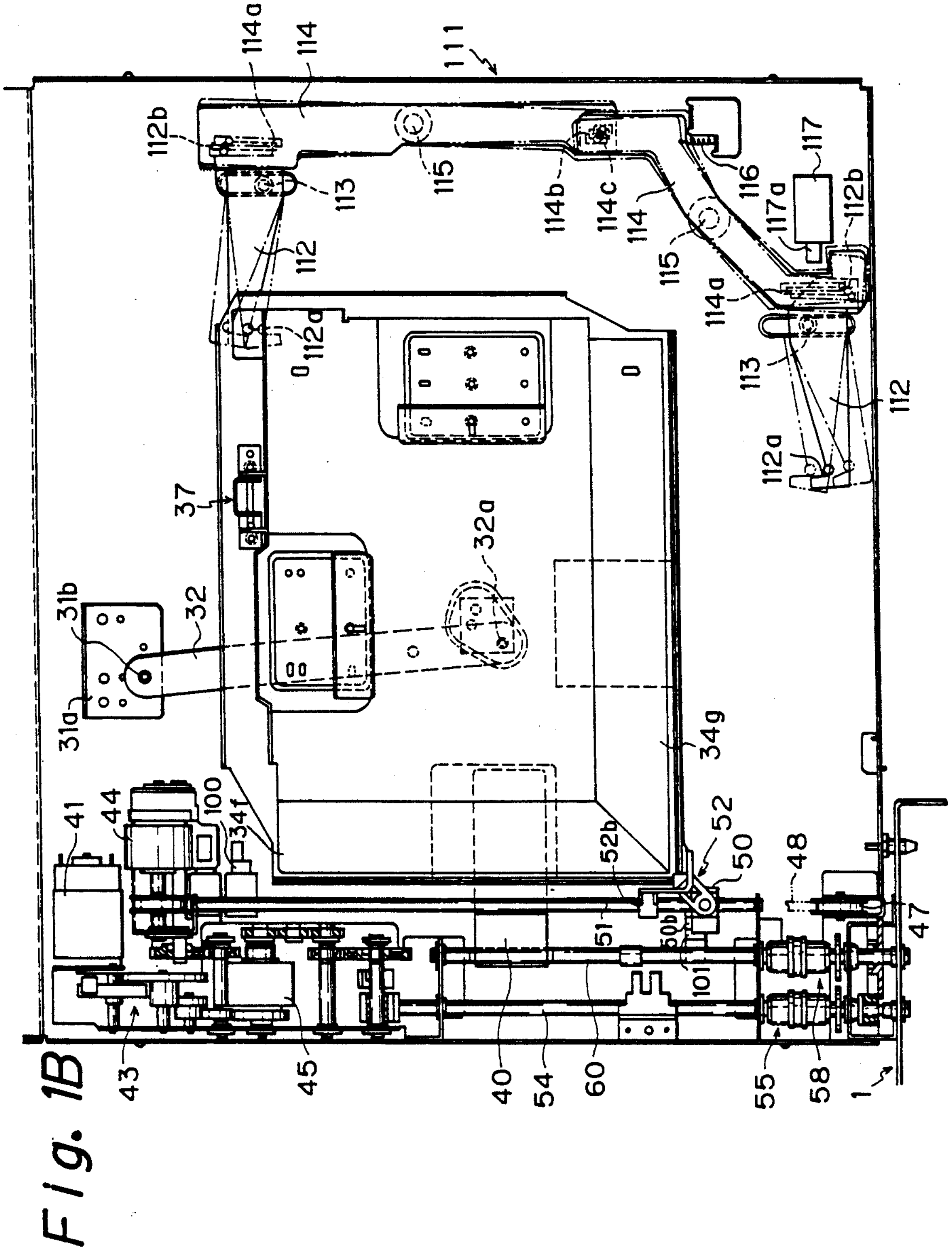
FIG. 1B is a view similar to FIG. 1A, in which however the sheet tray is located at a second position for longitudinal feed of the sheet.

As shown in FIGS. 1A and 1B, at the side of the non-paper feeding portion of the base member 31, a locking device 111 for locking the movable cassette 35 by engaging with the stopper portion 110 at a position where the movable cassette 35 has set each position of the longitudinal paper-feeding and the lateral paper-feeding. In the locking device 111, a locking member 112 having at its tip end a notch portion 112*a* for engagement with the stopper portion 110 is rotatably supported on a shaft 113 at its almost central portion. The locking portions 112 are disposed at two places to engage with the respective stopper portion 110 at the longitudinal feed state and stopper portion 110 at the lateral feed state. A pin 112*b* is projected at the rear end of each locking member 112 and is engaged with a long hole 114*a* formed at one side of a connecting plate 114. Each connecting plate 114 is journaled at its almost central portion on a shaft 115 so as to rotationally move around the horizon. A long hole 114*b* is formed at one end of the connecting plate 114 and a shaft 114*c* is formed on the other end thereof. By the engagement of the shaft 114*c* and the long hole 114*b*, the both connecting plates 114, 114 are connected. Namely, when one-hand locking member 112 and connecting plate 114 is in a locked state, the other-hand locking member 112 and the connecting plate 114 become also in a locked state and vice versa (i.e., both being in unlocked states). A spring 116 urging the plate 14 clockwise is loaded on the one-hand connecting plate 114. A solenoid 117 is connected to the other end of this one-hand connecting plate 114. The connecting plate 114 is arranged to rotationally move by forward and rearward movements of the solenoid 117.

The feed-out side of the movable cassette unit 26 (27) is provided with a drive mechanism 42 which conducts a drive for rotation of 90° of the movable cassette 35 and a drive for rotation of the lift plate 40 for lifting up the sheet in the movable plate 34, by one drive motor 41. In the drive mechanism 42, the output shaft of the drive motor 41 is fixed with gears 41*a*. Via gear members 43 which are meshed with a group of gears 41*a*, the drive force of the drive motor 41 is transmitted to a first clutch 44 and a second clutch 45.

The first clutch 44 is provided for interrupt the transmission of the drive force for the 90° rotation of the movable cassette 35 and is disposed at one end portion of the feed-out side of the movable cassette 35. An output shaft 44*a* of the first clutch 44 is fixed with a pulley 46. On the other hand, a pulley 47 is disposed at the other end portion of the feed-out side of the movable cassette 35. An endless belt 48 is applied around the both pulleys 46 and 47. A drive block 50 as a drive member is fixed at a fixed position where the endless belt 48 runs the underside between the pulleys 46 and 47. Thus, the drive block 50 moves reciprocatingly in response to the movement of the endless belt 48. A through hole is defined at almost center portion of the drive block 50 through which a guide shaft 51 which extends transversely to the feeding direction of the transfer paper between the both pulleys 46 and 47. By this guide shaft 51, the drive block 50 is linearly guided. In the shaft 51 may be curved.

A support shaft 50*a* is formed on the top portion of the drive block 50 and a connecting or holding member 52 is rotatably supported on support shaft 50*a*. The holding member 52 is formed with a substantially L-shaped angle portion 52*a*. The angle portion 52*a* is installed on the corner portion between the longitudinal feed-out side and the lateral feed-out side in the paper-feeding base 33. Position-detecting switches 100 and 101 are respectively disposed in the vicinity of one end side and the other end side of the guide shaft 51. The operation of the position-detecting switch 100 starts by pushing a switch operation piece 52*b* provided on the angle portion 52*a*. The operation of the position-detecting switch 101 starts by pushing an operation piece 50*b* of the drive block 50.

On the other hand, the second clutch 45 interrupts the transmission of a drive force for the lifting movement of a transfer copy in the movable plate 34. The output of the second clutch 45 is transmitted to the movable shaft 54 via a group of gears 53. Namely, the output of the second clutch 45 is transmitted from each gear of the group of gears to worm gears 53*a* and is run through a wheel gear meshed with the worm gears 53*a* and is transmitted to a movable shaft 54 which is provided crossing three-dimensionally with respect to the output shaft of the second clutch 45.

A joint portion 55*a* consisting of one part of a first coupling 55 is secured to the side of the other end of the movable shaft 54. On the other hand, a joint portion 55*b* consisting of the other part of the first coupling 55 is secured to the tip end of the movable shaft 56 which is rotatably supported on the side of the main body of the copying apparatus 1. The gear 56*b* secured to the movable shaft 56 is meshed with the gear 57*a* secured to the movable shaft 57. The movable shaft 57 is supported in parallel to the movable shaft 56 and is rotatably supported on the side of the main body of the copying apparatus 1 in similarity with the movable shaft 56. The tip end of the movable shaft 57 is secured with a joint portion 58*b* which consists one part of the second coupling 58. A joint portion 58*b* which consists of the other part of the second coupling 58 is secured to the tip end of the movable shaft 57. The joint portion 58*a* which consists the other hand of the second coupling 58 is fixed to one end of a lift-up shaft 60 which is provided in parallel with the second coupling 54. The engagements and disengagements of the joint portions 55*a* and 55*b* and those of the joint portions 58*a* and 58*b* in the first coupling are conducted by pushing the cassette unit 26(27) into and drawing out it from the main body of the copying apparatus 1. A lift-plate 40 is fixed to an almost central portion of the lift up shaft 60 and is rotatably moved by the rotation of the lift-up shaft 60 to lift up the feed-out side of the rotation plate 34. The other end of the lift-up shaft 60 is merely supported to be rotatable. Namely, any member is not connected to this other end of the lift-up shaft 60 and accordingly, it is entirely free in a state that the joint portion 58*a* disengages from the joint portion 58*b* and the lift plate 40 in a lifting-up state is naturally rotatably moved downward by its dead load.

Figure 4:
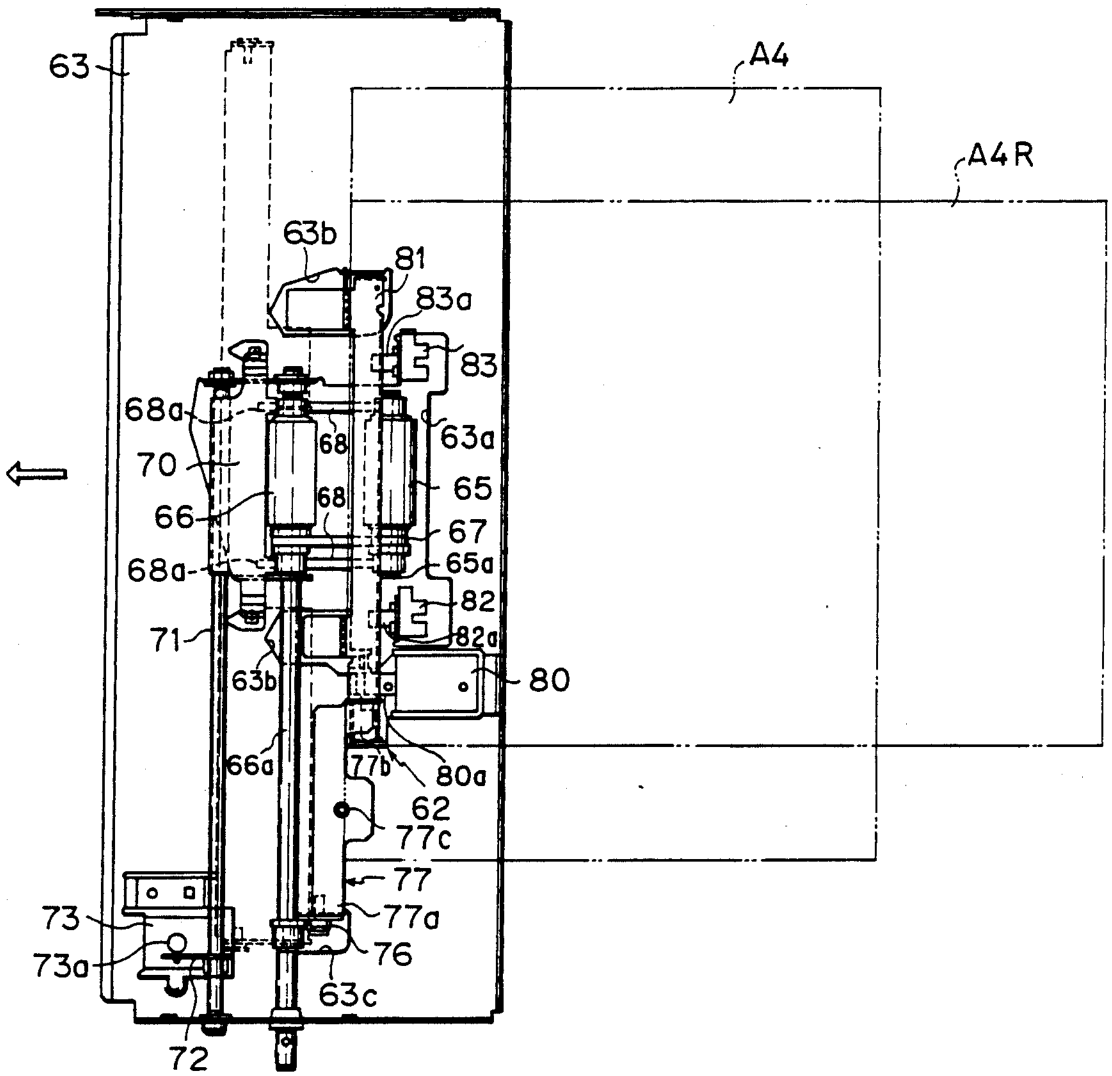
FIG. 4 is a plan view showing a device for feeding sheets out of the sheet tray.

At the upper position of the feed-out side in the movable cassette 35, as shown in FIG. 4, a support base 63 is fixedly provided to the main body side of the copying apparatus 1. The support base 63 is disposed with a paper-feeding mechanism 62 for feeding a transfer copy to the transfer paper feeding path 22. On the support base 63 are respectively formed a notched portion 63*a* by which parts of a taking-in roller 65 and a paper-feed roller 66 project out of the downward portion of the support base 63, a notched portion 63*b* by which a part of a paper return plate 81 projects out of the downward portion of the support base 63 and a notched portion 63*c* by which a part of a pressurized contact-release lever 76 projects out of the downward portion of the support base 63.

In the paper-feeding mechanism 62, the taking-in roller 65 is provided at an upper position of the feed-out side of the movable cassette 35. On the other hand, the paper-feeding roller 66 is disposed in parallel to the taking-in roller 65 and stands side by side with the latter at a fixed distance in the feeding direction of a transfer paper. The both rollers 65 and 66 rotate in the same direction by an endless belt 67 which is applied around at their one ends. A pair of roller arms 68, 68 is transversely applied between a support shaft 65*a* for rotatably supporting the taking-in roller 65 and a rotating shaft 66*a* for transmitting turning effect to a paper feed roller 66 so as to put the both rollers 65 and 66 between the pair of the roller arms 68, 68. When these roller arms 68, 68 rotatably move around the rotating shaft 66*a* as a fulcrum, the vertical movement of the taking-in roller 65 is conducted to carry out the encounter and disengagement of the taking-in roller 65 with respect to a transfer copy.

On the end of the paper-feed roller 66 at the roller arms 68, 68, protrusions 68*a*, 68*a* are respectively formed. When the protrusions 68*a*, 68*a* are pressed downward by the paper-feeding operation angle 70, the roller arms 68, 68 are rotatably moved upward. The paper-feeding operation angle 70 is fixed a the side of the one end of a paper-feeding operation shaft 71 and rotatably moves in company with the rotational movement of the paper-feeding operation shaft 71.

A solenoid connecting plate 72 is fixed at the other end of the paper-feeding operation shaft 71. A long hole is formed a the tip end of the solenoid connecting plate 72 and is connected with an operation shaft 73*a* of the paper-feeding operation solenoid 73. The reciprocal movement of the operation shaft 73*a* through the medium of the solenoid connecting plate 72 is converted into rotational movement in the paper-feeding operation shaft 71.

Figure 5A:
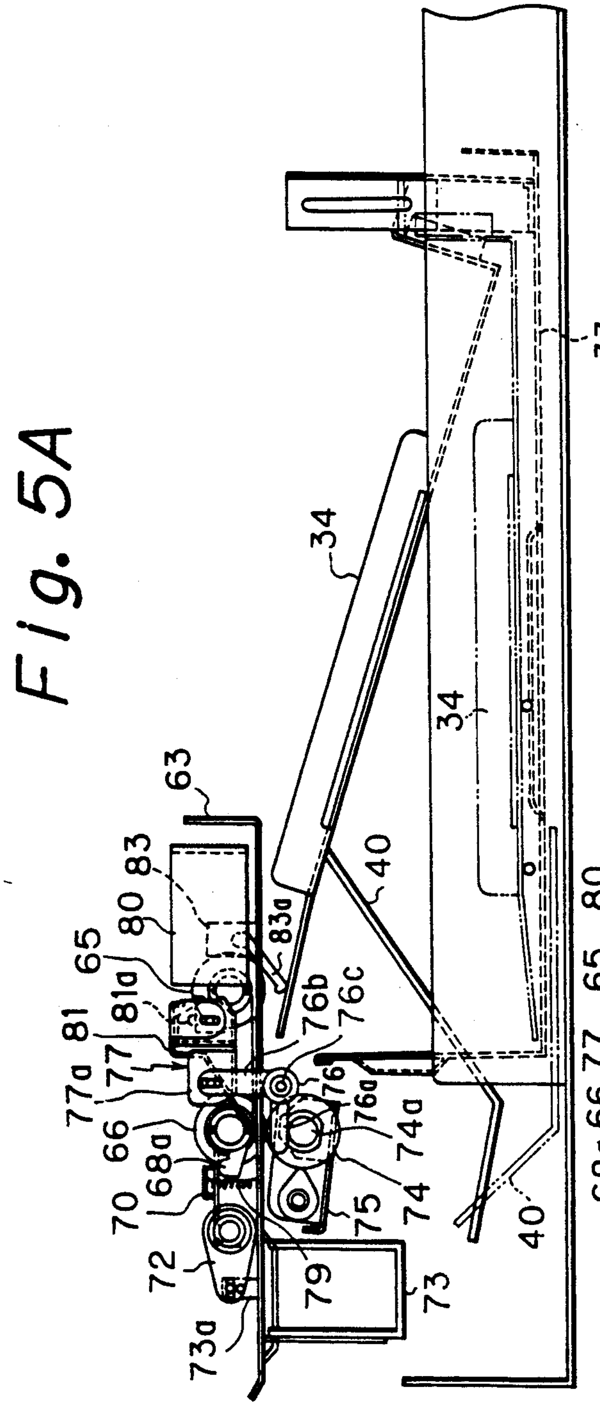
FIG. 5A is a side view of the sheet storing device shown in FIG. 1A.
Figure 5B:
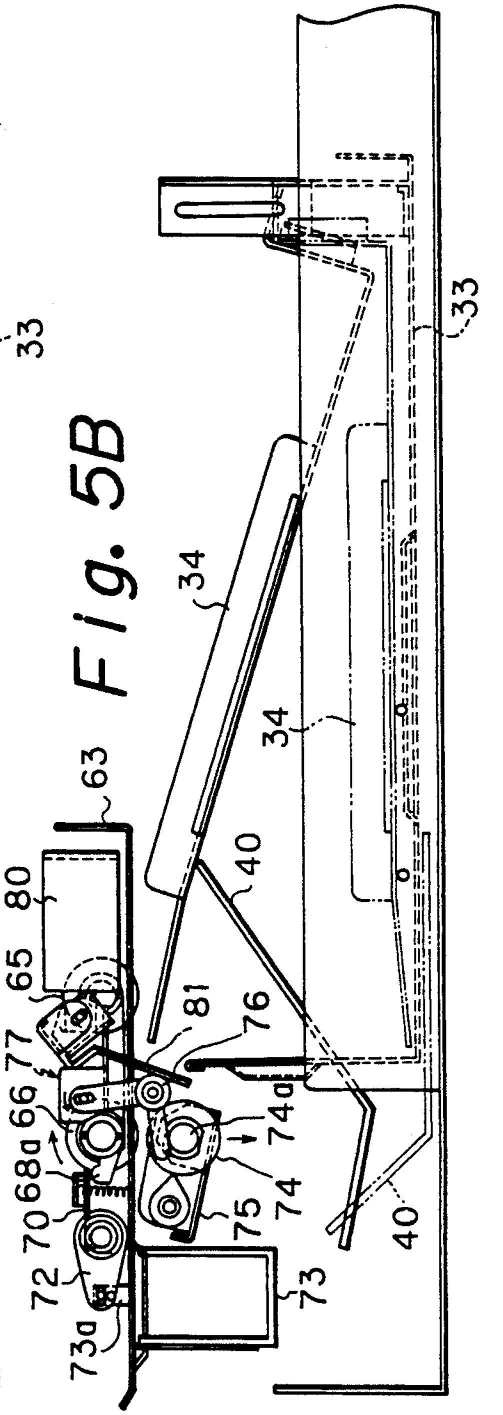
FIG. 5B is a side view similar to FIG. 5A, showing a state that a plate for returning the sheet and other components are operated.

As illustrated in FIGS. 5A and 5B, an installation plate 75 is arranged under the paper-feed roller 66. The installation plate 75 is equipped with a reverse roller 74 which returns and conveys a sheet by rotating in the same direction with the rotational direction of the paper-feed roller 66. The installation plate 75 is provided so as to rotationally move in the vertical direction. By this movement, press-contact and separation of the reverse roller 74 with respect to the paper-feed roller 66 is conducted. A rotating shaft 74*a* for transmitting a turning force to the reverse roller 74 is disposed under the rotating shaft 66*a* of the paper-feed roller 66 and in parallel with the rotating shaft 66*a*. An operation piece 76*a* of a press-contact release lever 76 having almost L-letter shape is disposed between the rotating shaft 66*a* and the rotating shaft 74*a*. The press-contact release lever 76 is provided so as to rotationally move perpendicularly by a shaft 76*c*. When the press-contact release lever 76 rotationally moves downward, the reverse roller 74 is pressed to be separated from the paper-feed roller 66.

A connecting piece 76*b* in the press-contact release lever 76 is connected to one end 77*a* of a press-contact connecting member 77. When the press-contact connecting member 77 rotationally moves around the horizon centering a shaft 77*c*, as shown in FIG. 4, the rotational movement of the press-contact release lever 76 is conducted. The other end of the press-contact release connecting member 77 is connected to a pin of an operation shaft 80*a* of a paper-returning operation solenoid 80. When the operation shaft 80*a* drives, the press-contact release connecting member 77 moves rotationally.

The operation shaft 80*a* of the paper-returning operation solenoid 80 is connected with a paper-returning plate 81 for returning a sheet to the side of the movable cassette 35. The paper-returning plate 81 is provided between the taking-in roller 65 and the paper-feed roller 66 at the side upper than a position of a pin of the operation shaft 80*a* so as to rotationally move. When the operation shaft 80*a* returns, the paper-returning plate 81 rotationally returns a sheet (not shown) to the side of the movable cassette 35.

A transfer sheet-detecting switch 82 and a non paper-detecting switch 83 are respectively disposed on the support base 63 and at the both sides of the taking-in roller 65. Operation pieces 82*a* and 83*a* of the respective switches 82 and 83 face to the underside of the support base 63 through the notched portion 63*a* of the support base 63. The operation pieces 82*a* and 83*a* of the respective switches 82 and 83 operate in a pushed state by the feed-out side of the movable plate 34 which is in a lifting-up state. The respective longitudinal feed-out side and lateral feed-out side of the movable plate 34 are formed with notched portions (not shown) corresponding to the operation piece 83*a* of the non paper-detecting switch 83. In a state that a sheet does not exist oh the movable plate 34, the operation piece 83*a* is not made "ON" because it advances the above-mentioned notches and the sheet-detecting switch is only made "ON".

On the other hand, in a state that a sheet is placed on the movable plate 34, the both detecting switches 82 and 83 is made "ON" by the existence of the sheet.

Next, explanation will next be made as to the movement of the movable cassette 35 from the position for the lateral feeding of a sheet to the position for the longitudinal feeding of a sheet with reference to FIGS. 1A and 1B.

As shown in FIG. 1A, in the position for the lateral feeding of the sheet, the feed-out side of the movable cassette 35 positions at the side of the feed-out side of the movable cassette unit 26 (27). In this state, the drive block 50 and the holding member 52 which constitutes a moving member are positioned at one end of the guide shaft 51. In such a state, locking members or claws 112, 112 and connecting plates 114, 114 are positioned at a locked position indicated by solid lines in the drawing, by the urge of the spring 116. In this case, the solenoid 117 is made "OFF" and a shaft 117*a* of the solenoid 117 is in a state that it advances by receiving the urging force of the spring 116 through the connecting plates 114.

When an order to move is issued from a control portion (not shown), the solenoid 117 is made "ON" and the shaft 117*a* of the solenoid 117 retreats. By this retreat, as shown by two-dotted-line in the drawing, the locking members 112, 112 and the connecting plates 114, 114 move rotationally against the urge of the spring 116 to be in an unlocking state. Simultaneously, the drive force of the drive motor 41 is transmitted to the pulley 46 via the first clutch 44. Then, the pulley 46 rotates to start the rotation of the belt 48. The drive block 50 fixed to the belt 48 moves to the other end of the guide shaft 51 by the guidance of the guide shaft 51.

By the linear movement of the drive block 50, the movable cassette 35 rotates in the A direction. Furthermore, by the movement of the drive block 50, the drive block 50 is apart from the position-detecting switch 100, so that the position-detecting switch is made "OFF" to disenergize the solenoid 111. Under the "OFF" state of the solenoid 117, the locking members 112, 112 and the connection plates 114, 114 urged by the spring 116 rotate and take a state where locking is possible, as shown by one-dotted line in the drawing.

As shown in FIG. 1A, the drive block 50, comes to the end of the guide shaft 51, an stopper portion 110 is inserted into an engaging notched portion 112*a* of a locking member 112 which is in a state that locking is possible. The locking members 112, 112 and the connecting plates 114, 114 receive the turning force of the movable cassette 35 to rotationally move against the urge of the spring 116. When the movable cassette 35 takes a completely longitudinally feeding state, the locking members 112, 112 and the connecting plates 114, 114 move to a position indicated by a solid line in the drawing and take a locking state. This locking state is conducted by obstructing the movement of the stopper portion 110 caused when the movable cassette 35 rotates, by the notched portion 112*a*.

Thus, it can prevent a case that the movable cassette 35 is slantingly diverged with respect to the direction of feeding sheets. In this case, a position to form the stopper portion 110 positions on a diagonal line with the drive block 50, so that the movable cassette 35 is stopped at two points (the drive block 50 and the stopper portion 110) on the diagonal line. When the movable cassette 35 becomes in a rotational deviation centering around its rotating center (the support shaft 32*a*), a corner portion which is at a far position from the center portion is a part which has the greatest vibration by the rotation. Thus, by stopping the both corner portions positioning on the diagonal line, the prevention of the rotational deviation of the movable cassette 35 can be surely accomplished.

In this connection, when the movable cassette 35 takes a completely longitudinally feeding state, the position-detecting switch 101 is operated by the operating piece 50*b* of the drive block 50. The operation of the position-detecting switch 101 is detected by the control portion of the copying apparatus 1 and the control portion beaks down the transmission of the drive force by the first clutch 44, whereby stopping the movement of the drive block 50. In this state, the longitudinal portion in the movable cassette 35 is directed to the feed-out side of the movable cassette unit 26(27).

On the other hand, the movement from the longitudinally feeding state to the laterally feeding state in the movable cassette 35 is practicised by reversing the drive motor 41 and conducting the operation opposing to the above-mentioned operation. Even under this moving state, in similar way mentioned above, the locking device 111 operates to conduct the stop of the rotation of the movable cassette 35.

In the embodiments of the present invention, since the drive block 50 is moved by the belt 48, the movement of the drive block 50 is quickly carried out and switching of each position can be rapidly made and therefore, it can reduce the operator's waiting time as less as possible.

As described above, the mechanism for stopping movement of a movable cassette according to the present invention is a mechanism for obstructing any rotation or movement except for a rotation or movement caused by drive members of a movable cassette which is driven for rotation by the drive members which are connected at vicinity of corner portions between a longitudinal feed-out side and a lateral feed-out side of the movable cassette and reciprocatingly drives in a direction orthogonal to the direction of feeding papers at a feed-out side of a movable cassette unit. Said mechanism comprises an stopper portion formed at the vicinity of corner portions between respective non feed-out sides of the movable cassette and locking device for obstructing the rotation of the movable cassette in engagement with the stopper portion at a position where the movable cassette takes a position of longitudinally paper-feeding or laterally paper-feeding.

Under the above construction, it can be prevented such an affair that in a case that a large number of sheets is loaded on the movable cassette, the movable cassette is directed slantingly to the direction of feeding sheets due to the generation of unnecessary rotation of the movable cassette loaded with such a large number of the papers. Moreover, the effect for surely preventing the rotational deviation of the movable cassette can be simultaneously exerted by the both corner portions of the movable cassette positioned on the diagonal line.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. A device for storing rectangular sheets to be fed into a sheet conveying path in an image forming apparatus, comprising:

a movable sheet tray for stacking thereon the rectangular sheets, said movable tray having first and second sides used for longitudinal and lateral feeds of a sheet with respect to said sheet conveying path, respectively, said sheet tray being movably supported on a base member for the movement between first and second positions at which said first and second sides of said sheet tray are located at a constant position for said longitudinal and lateral feeds of the sheet, respectively;

a connecting member joined to said sheet tray at a position near the intersection of said first and second sides thereof;

reciprocating means for causing said sheet tray to be moved between said first and second positions by reciprocating said connecting member in a direction transverse to the feeding direction of the sheet with respect to said sheet conveying path; and locking means for locking said sheet tray to said base member at diagonal positions to said connecting member with respect to said first and second positions of said sheet tray.

2. A device according to claim 1, wherein said base member is provided with an arm which is pivotally mounted at one end thereof on said base member, said sheet tray being rotatably supported on the other end of said arm so as to move between said first and second positions, when said connecting member is reciprocatingly moved, in such a manner that said sheet tray is rotated while being moved in a direction generally parallel to the feeding direction of the sheet.

3. A device according to claim 1, wherein said reciprocating means comprises a guide shaft which is supported on said base member and which extends in a direction transverse to said feeding direction of the sheet, a carriage which is slidably guided by said guide shaft, and belt drive means which is operatively connected to said carriage in order to reciprocate said carriage, said connecting member being rotatably supported on said carriage.

4. A device according to claim 1, wherein said locking means comprises a pair of locking claws which are movable between respective engagement positions for catching said sheet tray at said first and second positions and respective releasing positions for releasing said sheet tray from said first and second positions, and claw drive means for moving said locking claws between said engaging and releasing positions.

5. A device according to claim 4, wherein said claw drive means comprises a solenoid and means for operatively interlocking said locking claws and said solenoid.

6. A device according to claim 1, wherein said base member is detachably inserted into said image forming apparatus.

7. A device according to claim 1, wherein said sheet tray comprises a base plate, an upper plate provided on said base plate to support thereon the sheets, and lifting means for slantingly lifting said upper plate from said base plate in accordance with decrease of the number of the sheets.

* * * * *